United States Patent
Gordon

(10) Patent No.: US 12,430,296 B2
(45) Date of Patent: Sep. 30, 2025

(54) SECURE FILE SYNCHRONIZATION TOOL

(71) Applicant: Gregory Scott Gordon, Basalt, CO (US)

(72) Inventor: Gregory Scott Gordon, Basalt, CO (US)

( * ) Notice: Subject to any disclaimer, the term of this patent is extended or adjusted under 35 U.S.C. 154(b) by 0 days.

(21) Appl. No.: 18/201,126

(22) Filed: May 23, 2023

(65) Prior Publication Data

US 2024/0394227 A1  Nov. 28, 2024

Related U.S. Application Data

(60) Provisional application No. 63/357,695, filed on Jul. 1, 2022.

(51) Int. Cl.
  *G06F 16/178* (2019.01)
  *G06F 16/16* (2019.01)

(52) U.S. Cl.
  CPC ........ *G06F 16/1787* (2019.01); *G06F 16/168* (2019.01)

(58) Field of Classification Search
  CPC ... G06F 16/1787; G06F 16/168; G06F 16/178
  See application file for complete search history.

(56) References Cited

U.S. PATENT DOCUMENTS

| | | | | |
|---|---|---|---|---|
| 6,505,214 B1* | 1/2003 | Sherman | ............... | G06F 16/273 709/248 |
| 7,363,330 B1* | 4/2008 | Ellman | ................. | G06F 16/182 707/634 |
| 9,773,051 B2* | 9/2017 | Smith | .................. | G06F 16/1824 |
| 10,162,319 B2* | 12/2018 | Klein | ................. | G05B 19/0426 |
| 11,528,149 B2* | 12/2022 | Fradkin | ................. | H04L 9/3271 |
| 2003/0023347 A1* | 1/2003 | Konno | ............... | G05B 19/0426 700/245 |
| 2007/0208803 A1* | 9/2007 | Levi | ....................... | H04L 51/214 709/203 |
| 2014/0310746 A1* | 10/2014 | Larsen | ............... | H04N 21/8547 725/37 |
| 2016/0070717 A1* | 3/2016 | Bergner | ................. | G06F 16/178 707/638 |
| 2017/0039168 A1* | 2/2017 | Hassan | ................... | G06Q 10/10 |
| 2019/0207940 A1* | 7/2019 | Kleinpeter | ............ | G06F 16/128 |
| 2019/0208014 A1* | 7/2019 | Goldberg | ................ | G06F 9/547 |

* cited by examiner

*Primary Examiner* — Angelica Ruiz
(74) *Attorney, Agent, or Firm* — Cozen O'Connor

(57) ABSTRACT

A sync tool reorganizes or synchronizes a primary path and a secondary path. The sync tool receives the primary path and the secondary path from the user and determines differences between (a) primary folders and primary files at the primary path and (b) secondary folders and secondary files at the secondary path. The sync tool generates a set of actions based on the differences to reorganize or synchronize the primary path and the secondary path. Prior to reorganizing or synchronizing, the sync tool interacts with the user to edit the set of actions and then implement the set of actions to reorganize and/or synchronize the primary path and the secondary path.

7 Claims, 6 Drawing Sheets

SECURE FILE SYNCHRONIZATION TOOL

RELATED APPLICATION

This application claims priority to U.S. Patent Application No. 63/357,695, filed Jul. 1, 2022, which is incorporated herein by reference in its entirety.

BACKGROUND

Cloud based file synchronization tools store files in a cloud folder and provide a local folder on a user's computer to store replicated copies of the files. However, an internet connection between the user's computer and the cloud is required to maintain synchronization of the local folder with the cloud folder. When the user's computer does not have an internet connection, there is no indication as to whether the files in the local folder and the cloud folder are synchronized.

SUMMARY

When a user has both an office computer (e.g., a desktop computer that remains at an office location) and a mobile computer (e.g., a laptop or notebook computer) that is taken to meetings and conferences remote from the office, the user wants certain work files (not necessarily all files) available on both machine and synchronized. Often a cloud folder stores master copies of the user's files, whereby the office computer and the mobile computer synchronize a local folder with the cloud folder. One aspect of the present embodiments includes the realization that cloud based file synchronization relies on the computer having a reliable internet connection to retrieve files from the cloud folder onto the user's computer (e.g., one of the mobile computer or the office computer). Where the internet connection is unavailable-such as at a remote meeting, or where a password that allows the mobile computer to connect to the cloud service, or where a password for access to a Wi-Fi access point is unknown, or where the Wi-Fi access point delivers an unreliable Wi-Fi connection to the internet, or other similar scenarios—the synchronization between the mobile computer and the cloud folder may not occur. Accordingly, certain files may be unavailable on the mobile computer or may be old. Further, at remote locations, internet connectivity may be insecure, imposing a security risk to the user when transferring secret files at the remote location. The present embodiments solve this problem by providing a direct and secure synchronization tool that gives the user more control of files that are synchronized between two paths (drives and/or folders) on two networked computers.

The use of cloud drives as a primary and/or back-up storage device is a growing and vital tool for individuals and modern businesses. Several of the more prominent cloud server providers advertise how they integrate their service with the user's desktop for ease and familiarity. These providers typically do this by allowing their customers to utilize a "local folder", which appears to the user like any other folder on their local computer, in which the user can store directories and files. Unlike the typical local folder however, the cloud server has continual access to this particular local folder in order to keep the cloud server and the local folder synched-up. The sub-directories and files in that local folder are automatically synched to an online/cloud-based server, or vice versa. Depending on the service and/or the user preference, the files and directories in the local folder are either stored entirely and exclusively in the cloud to save local disk space, or copies are maintained on the local computer. For certain users, especially those who often travel to places that may not have secure or reliable internet, it is vital that a local copy of some or more files is maintained; otherwise, the user might not have access to his or her files. Or he or she may not be comfortable using an unprotected internet connection to do so.

Moreover, users with sensitive files (e.g., sensitive legal documents) may not be comfortable storing these files on a cloud service, or in a local folder accessible by the cloud service. Such local folder access presents an opportunity for a hacker to gain access to the sensitive files, either within the local folder or at the cloud folder. Tampering with either one of these folders results in the other folder also being similarly modified, and this presents the risk of the files being deleted and lost. Similarly of concern, access to the folders and/or online account may be lost for any number of reasons, such as an expired credit card, lost password, etc., and therefore preventing the user from accessing potentially crucial files.

The present embodiments solve this problem by providing a secure file synchronization tool that permits synchronization of sensitive files with trusted computers, cloud services, and removable storage medium, but without requiring continuously or frequent "behind the scenes" access to the local folder. The secure file synchronization tool also permits the local folder to be synchronized with another trusted computer such as a laptop the user may also use primarily when travelling, etc.

The secure file synchronization tool provides the user with control and security over sensitive files and folders, as compared to conventional cloud based services and tools that create risks and vulnerability exploitable by hackers.

DETAILED DESCRIPTION OF THE EMBODIMENTS

A secure file synchronization tool provides two functions (a reorganize function and a global synchronization function) that may work together to synchronize multiple folders (also known as directories; folder and directory may be used interchangeably herein), which may be located on a variety of mediums. A user selects a primary folder and a secondary folder for synchronization, and the selected function first "inspects" the contents of the selected folders (including all subfolders, sub-subfolders, etc.). For example, one of the selected folders may be a local folder (e.g., a folder on a hard drive of the computer running the secure file synchronization tool) and the other folder may be on a cloud service, another computer, or a removable storage medium (e.g., a thumb-drive, external hard-drive, etc.).

The selected function (e.g., reorganize function or global synchronization function) then compares the list of files in each folder to determine: (i) if there is a sub-directory in one parent folder which is not in the second chosen parent folder, (ii) if there is a file in one directory which is not in the same relative path of the other, or (iii) if there is a file in the same relative path in both parent folders where one of the same-named files has been modified more recently than the other. Each function then presents the user with a set of suggested actions to restructure or synchronize the two folders.

Figure 1:
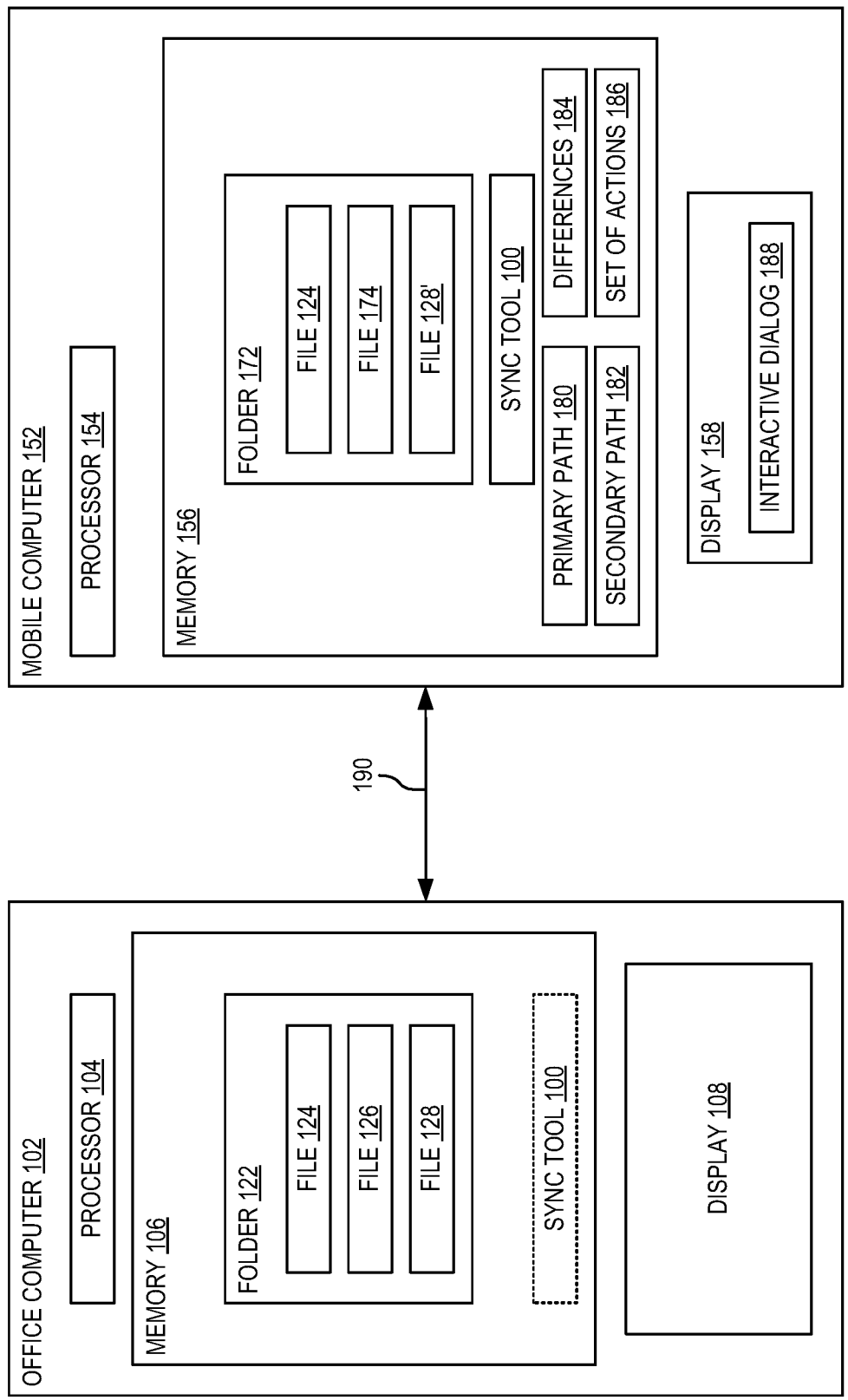
FIG. 1 is a block diagram illustrating one example secure file synchronization tool, in embodiments.

FIG. 1 is a block diagram illustrating one example secure file synchronization tool 100 (sync tool 100), in embodiments. Sync tool 100 includes machine-readable instructions stored on non-transitory computer-readable media that when executed by a digital processor cause the processor to synchronize folders and files between two user selected paths.

An office computer 102 has a digital processor 104 communicatively coupled with memory 106 and a display 108. A mobile computer 152 has a digital processor 154 communicatively coupled with memory 156 and a display 158. Sync tool 100 is shown stored in memory 156 such that it may be executed by digital processor 154. In this example, the sync tool is shown running on mobile computer 152; however, sync tool 100 may also be stored in memory 106 and run on office computer 102. Sync tool 100 does not need to run simultaneously on both computers 102 and 152, but could run on either one. Office computer 102 and mobile computer 152 are connected via a network 190, which may represent wired and/or wireless connectivity and/or secure connection (e.g., a virtual private network (VPN)). Sync tool 100 may also operate with a cloud service to synchronize folders and files between office computer 102 and/or mobile computer 152 and cloud based storage; however, cloud storage is not required.

For purposes of this example, memory 106 of office computer 102 stores a folder 122 containing files 124, 126, and 128. Files 124, 126, and 128 may represent any type of file stored on office computer 102, such as documents, drawings, data, configuration files, and so on. Memory 156 of mobile computer 152 stores a folder 172 containing files 124, 174, and 128', where file 124 is the same as file 124 on office computer 102 and file 128' is an older version of file 128 on office computer 102. Folder 172 does not contain file 126, but contains file 174 which is not within folder 122 of office computer 102. Memory 106 and/or memory 156 may store more or fewer folders and files without departing from the scope hereof.

A user runs sync tool 100 on mobile computer 152 and interactively selects folder 122 of office computer 102 as a primary path 180, and folder 172 of mobile computer 152 as a secondary path 182. Sync tool 100 determines differences 184 between (a) primary path 180 (e.g., folder 122 and files 124, 126, and 128 of office computer 102) and (b) secondary path 182 (e.g., folder 172 and files 124, 172, and 128' of mobile computer 152), where differences 184 are used to generate a set of actions 186 needed to synchronize secondary path 182 with primary path 180. Sync tool 100 then displays differences 184 and set of actions 186 within an interactive dialog 188 on display 158. Accordingly, the user may see the actions needed to synchronize secondary path 182 with primary path 180 and advantageously, the user may interact with interactive dialog 188 to select and delete actions from set of actions 186 that the user does not want sync tool 100 to perform.

Sync tool 100 may include two functions: (a) a reorganize function that changes a secondary path to match a primary path by adding and deleting folders and files in secondary path 182 such that it matches folders and files of primary path 180, and (b) a global synchronize function that updates primary path 180 to have folders and files of secondary path 182 and updates secondary path 182 to have folders and files of primary path 180.

Figure 2:
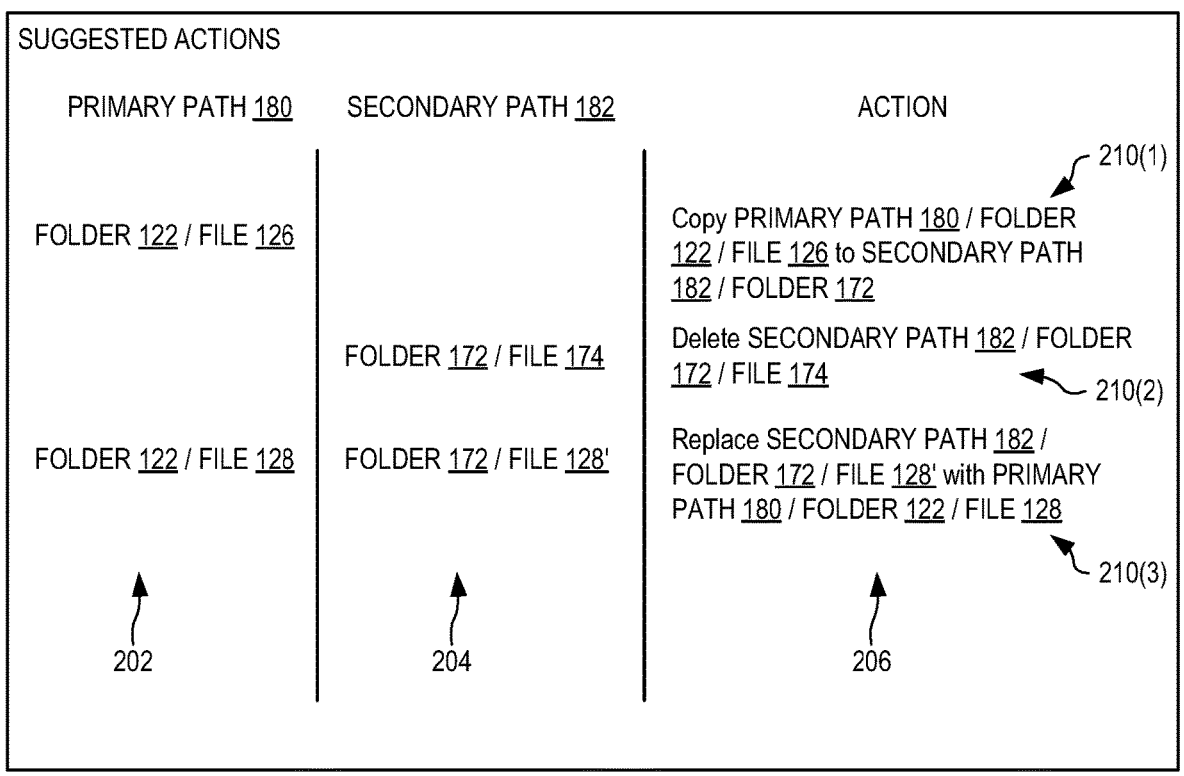
FIG. 2 shows one example interactive dialog for a reorganize function of the sync tool of FIG. 1, in embodiments.
Figure 3:
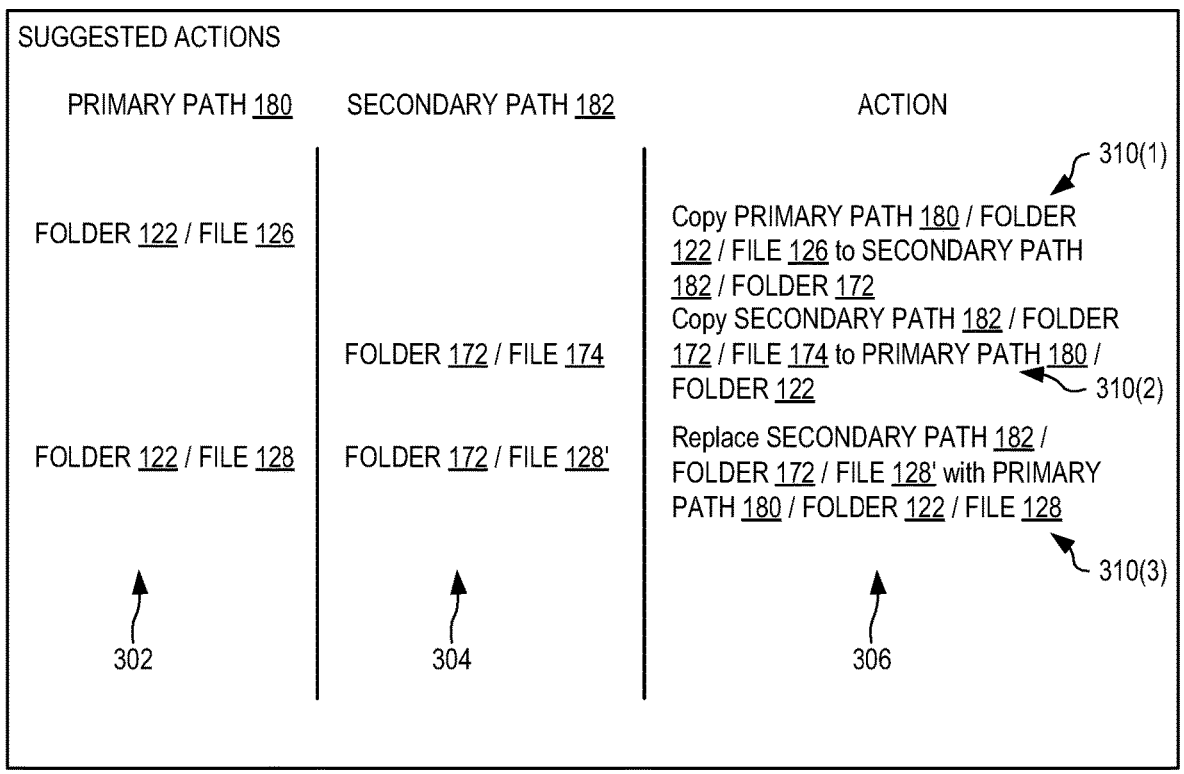
FIG. 3 shows one example interactive dialog for a global synchronize function of the sync tool of FIG. 1, in embodiments.

For descriptive purposes in the following examples, reference labels and numbers are shown where names would be used. In FIGS. 2 and 3, for example, a name of folder 122 would be displayed in place of "FOLDER 122," a name of file 126 would be displayed in place of "FILE 126," and so on. Particularly, when comparing folders and files, the names of folders 122/172 and files 124/126/128/128'/174 are used followed by a descriptive comparison of the created and/or last edited date of the file.

Comparison Methodology

Regardless of which function the user invokes, after selecting the primary path and the secondary path, sync tool 100 captures and compares the folder structure and file names from each path, summarized as follows: (1) make two lists of all sub-folders and files at each of the primary path and the secondary, respectively, (2) normalize the secondary list with the primary list by replacing the secondary path with the primary path. This effectively allows the two lists to be compared directly and ignores differences between the values of the primary path and the secondary path. For example, if the user selects a primary path of "C:\Users\UserX\Documents\Clients" and a secondary path of "C:\Users\UserX\OneDrive-UserX\Cloud Backup" (e.g., a folder called "Cloud Backup" in a OneDrive folder), sync tool 100 replaces the portion "C:\Users\UserX\OneDrive-UserX\Cloud Backup" of each entry in the secondary list with "C:\Users\UserX\Documents\Clients".

Reorganize Function

The reorganize function synchronizes the contents of folders at the secondary path with folders of the primary path, giving priority to folders identified by the primary path. For example, after a user has manually reorganized files and folders at the primary path, the reorganize function allows the user to replicate that reorganization at the secondary path. For example, if a user moves correspondence files related to a particular person to a new sub-folder of an existing broader correspondence folder, that new sub-folder, and the correspondence files moved into that new sub-folder, will also be created at the secondary path. The reorganize function accomplishes as follows: (i) if there is a sub-folder at the primary path that is not at the secondary path, the reorganize function creates a suggested action adding the sub-folder at the secondary path, (ii) if there is a sub-folder at the secondary path that is not at the primary path, the reorganize tool creates a suggested action to delete the sub-folder from the secondary path, (iii) if there is a file/files at the primary path (including sub-folders) that is/are not found at a corresponding folder of the secondary path, such as when files are moved into a new sub-folder at the primary path, the reorganize function generates a suggested action to add those files to the corresponding folder at the secondary path (e.g., to a folder of the same name and position as in the primary path), (iv) if there are files in any folder or subfolder (recursively) at the secondary path that are not in corresponding folder at the primary path, reorganization function generates suggested actions to delete those files from the folders at the secondary path, and (v) if there are two files in corresponding folders at the primary path and the secondary path, and the file in the folder at the primary path is more recently modified, the reorganize function generates a suggested action to overwrite the file at the secondary path with the file from the primary path.

FIG. 2 shows one example interactive dialog 200 for a reorganize function of sync tool 100, in embodiments. Interactive dialog 200 is an example of interactive dialog 188 of FIG. 1 and shows a primary path column 202 that lists folders and files that are within primary path 180 and different (e.g., identified within differences 184) from secondary path 182. Interactive dialog 200 also shows a secondary column 204 that lists folders and files that are within secondary path 182 and different (e.g., identified within differences 184) from primary path 180. Interactive dialog 200 also shows an action column 206 that lists actions needed to synchronize secondary path 182 with primary path 180.

In this example, a first action 210(1) copies file 126 from folder 122 in primary path 180 to folder 172 in secondary path 182 because file 126 is in folder 122 and not in folder 172; a second action 210(2) deletes file 174 from folder 172 in secondary path 182 because there is no corresponding file in folder 122 of primary path 180; and a third action 210(3) copies file 128 from folder 122 in primary path 180 to folder 172 in secondary path 182 because file 128 in folder 122 is newer than file 128' in folder 172 of secondary path 182.

In the reorganize function, actions are generated to make both secondary path 182 have the same folders and files as primary path 180, deleting folders and files from secondary path 182 where they are not present in primary path 180. However, these actions have not yet been taken by sync tool 100. The user may select one or more of actions 210 within interactive dialog 200 and then select a delete selected button 212 within interactive dialog 200 to remove the selected actions 210. This step of deleting actions can be repeated as needed. When the user selects a sync button 214, sync tool 100 performs any action remaining within action column 206. Advantageously, the user may cause sync tool 100 to omit actions not required. For example, where the user knows that file 126 is not needed on mobile computer 152, the user may select action 210(1) followed by delete selected button 212 to remove it from action column 206.

When the user determines that actions 210 remaining within action column 206 should be taken, the user selects sync button 214, which causes sync tool 100 to implement remaining actions 210 within action column 206 (e.g., actions 210(2) and 210(3) in this example).

Global Synchronization Function

The global synchronization function synchronizes the contents of folders at the secondary path with folders at the primary path and synchronizes folders at the primary path with folders at the secondary path. After capturing and comparing the folder structs and files, the global synchronization tool generates suggested actions as follows: (i) if there is a sub-folder at either one of the primary path and the secondary path that is not at the other path, a suggested action is generated to add the sub-folder to the other path, (ii) if there is a file in either one of the primary path and the secondary path that is not at the other path, a suggested action is generated to add the file to the other path, (iii) if there are files present at both the primary path and the secondary path where one of the files is newer than the other (e.g., more recently modified), a suggested action is generated to overwrite the older of the two files with the newer of the two files. The global synchronization function does not generate suggested actions to delete folders or files. Advantageously, where files have been created or modified at both the primary path and the secondary path, the global synchronization function copies the newly created or newer files from either path to the other path without deleting anything.

FIG. 3 shows one example of interactive dialog 300 for a global synchronize function of sync tool 100, in embodiments. Interactive dialog 300 is an example of interactive dialog 188 of FIG. 1 and shows a primary path column 302 that lists folders and files that are within primary path 180 and different (e.g., identified within differences 184) from secondary path 182. Interactive dialog 300 also shows a secondary column 304 that lists folders and files that are within secondary path 182 and different (e.g., identified within differences 184) from primary path 180. Interactive dialog 300 also shows an action column 306 that lists actions needed to synchronize secondary path 182 with primary path 180.

In this example, a first action 310(1) copies file 126 from folder 122 in primary path 180 to folder 172 in secondary path 182 because file 126 is in folder 122 and not in folder 172; a second action 310(2) copies file 174 from folder 172 in secondary path 182 to folder 122 of primary path 180 because file 174 is in folder 172 and not in folder 122; and a third action 310(3) copies file 128 from folder 122 in primary path 180 to folder 172 in secondary path 182 because file 128 in folder 122 is newer than file 128' in folder 172 of secondary path 182.

In the global synchronization function, no folders or files are deleted and the actions are generated to make both primary path 180 and 182 have the same folders and files. However, these actions have not yet been taken by sync tool 100. The user may select one or more of actions 310 within interactive dialog 300 and then select a delete selected button 312 within interactive dialog 300 to remove the selected actions 310. This step of deleting actions can be repeated as needed. When the user selects a sync button 314, sync tool 100 performs any action remaining within action column 306. Advantageously, the user may cause sync tool 100 to omit actions not required. For example, where the user knows that file 126 is not needed on mobile computer 152, the user may select action 310(1) followed by delete selected button 312 to remove it from action column 306.

When the user determines that actions 310 remaining within action column 306 should be taken, the user selects sync button 314, which causes sync tool 100 to implements remaining actions 310 within action column 306 (e.g., actions 310(2) and 310(3) in this example).

Suggested Actions

As shown in FIGS. 2 and 3, each of the reorganize function and the global synchronize function displays a tree, replicating the folder structure, of suggested actions that may be taken. The action list is interactive and allows the user to delete any suggested action that they do not wish to have performed. Once the user has deleted any undesired actions, the user selects the sync button to proceed with the remaining actions. Sync tool 100 may request confirmation that the user wishes to proceed, and upon confirming, sync tool 100 executes the remaining actions in the list. The status of the suggested action, and an indication as to whether the action was successful is displayed in real time on the user's terminal screen, and may be written to a log file which the user may selectively review/access. The log-file may be overwritten each time, unless the user saves the file under a different name.

Figure 4:
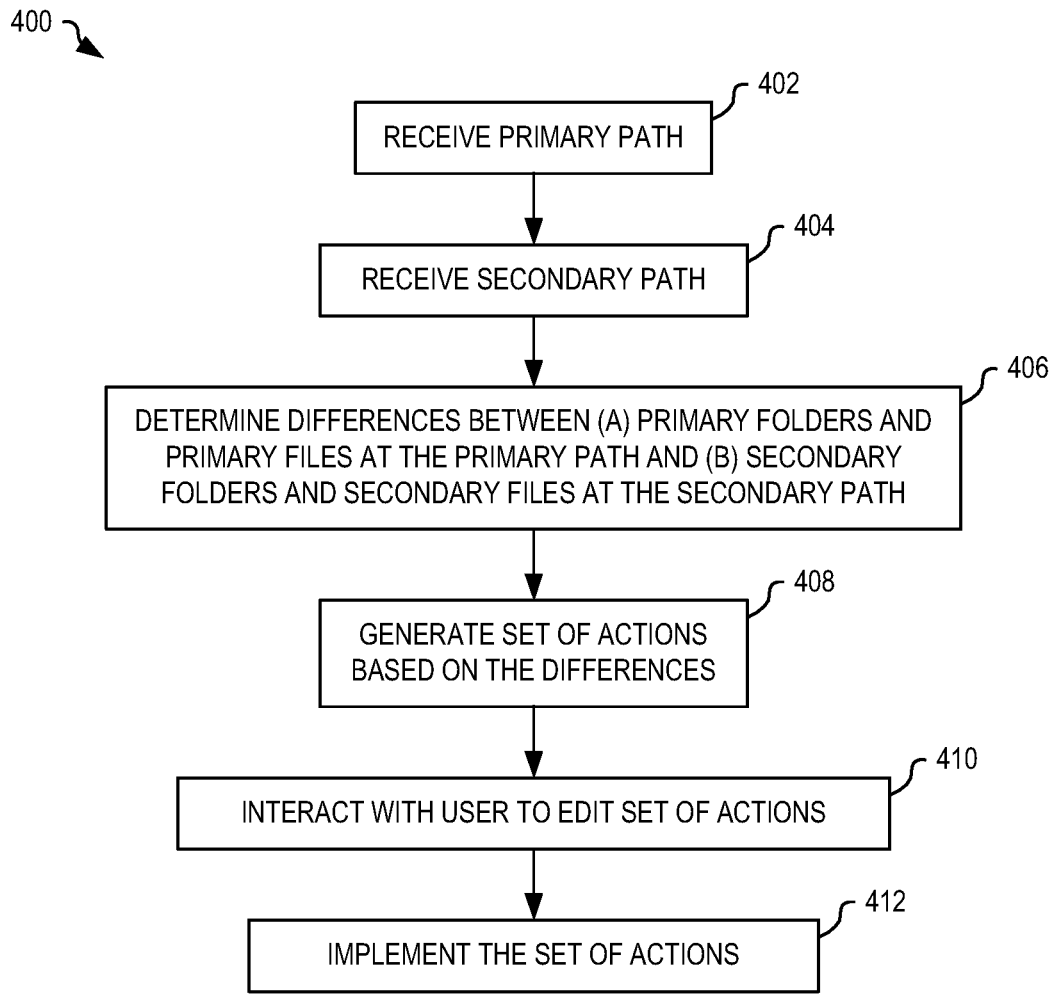
FIG. 4 is a flowchart illustrating one example method for secure file synchronization, in embodiments.

FIG. 4 is a flowchart illustrating one example method 400 for secure file synchronization, in embodiments. Method 400 is implemented by sync tool 100 of FIG. 1 for example.

In block 402, method 400 receives a primary path from the user. In one example of block 402, the user inputs primary path 180 to sync tool 100 running on mobile computer 152. In block 404, method 400 receives a secondary path from the user. In one example of block 404, the user inputs secondary path 182 to sync tool 100 running on mobile computer 152.

In block 406, method 400 determines differences between (a) primary folders and primary files at the primary path and (b) secondary folders and secondary files at the secondary path. In one example of block 406, sync tool 100 determines differences 184 to include (a) file 126 in folder 122 at primary path 180 is missing from corresponding folder 172 at secondary path 182, (b) file 174 in folder 172 at secondary path 182 is missing from folder 122 at primary path 180, and (c) file 128 in folder 122 at primary path 180 is newer than file 128' in folder 172 at secondary path 182.

In block 408, method 400 generates a set of actions based on the differences. In one example of block 408, sync tool 100 generates set of actions 186 based on differences 184. In block 410, method 400 interacts with the user to edit the set of actions. In one example of block 410, sync tool 100 displays interactive dialog 188 on display 158 of mobile computer 152 and interacts with the user to edit actions 210 within action column 206.

In block 410, method 400 implements the set of actions. In one example of block 410, sync tool 100 interprets actions 210 remaining in action column 206 to update one or both of primary path 180 and secondary path 182.

Figure 5:
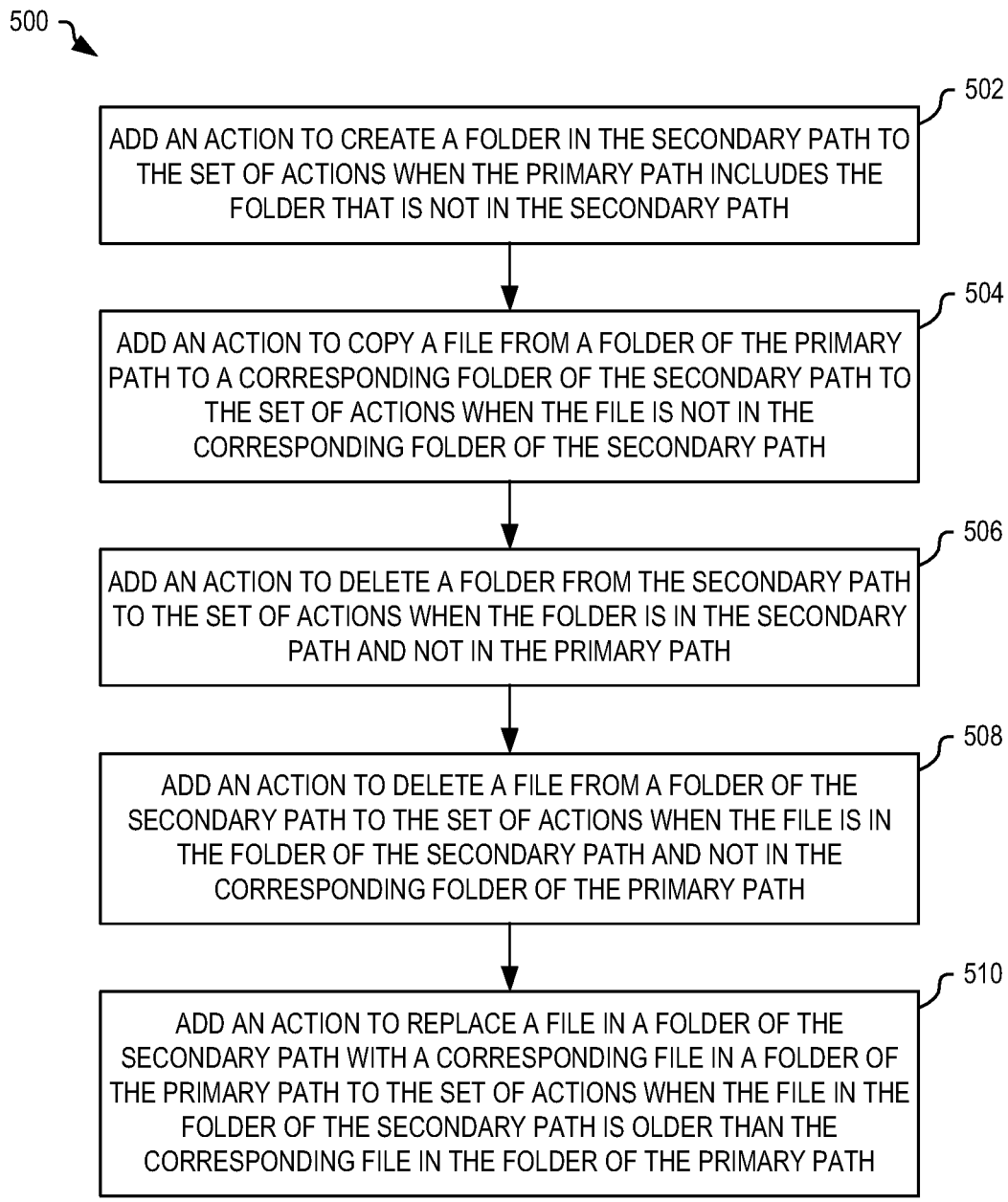
FIG. 5 is a flowchart illustrating one example method for generating a set of actions to reorganize the secondary path based on the primary path, in embodiments.

FIG. 5 is a flowchart illustrating one example method 500 for generating a set of actions to reorganize secondary path 182 based on primary path 180, in embodiments. Method 500 is one example of functionality of block 408 of FIG. 4 for example.

In block 502, method 500 adds an action to create a folder in the secondary path to the set of actions when the primary path includes the folder that is not in the secondary path. In one example of block 502, sync tool 100 adds an action to create folder 172 at secondary path 182 when folder 172 is not present.

In block 504, method 500 adds an action to copy a file from a folder of the primary path to a corresponding folder of the secondary path to the set of actions when the file is not in the corresponding folder of the secondary path. In one example of block 504, sync tool 100 adds action 210(1) to set of actions 186.

In block 506, method 500 adds an action to delete a folder from the secondary path to the set of actions when the folder is in the secondary path and not in the primary path. In one example of block 506, sync tool 100 creates an action to delete folder 172 when folder 172 is not at primary path 180.

In block 508, method 500 adds an action to delete a file from a folder of the secondary path to the set of actions when the file is in the folder of the secondary path and not in the corresponding folder of the primary path. In one example of block 508, sync tool 100 adds action 210(2) to set of actions 186.

In block 510, method 500 adds an action to replace a file in a folder of the secondary path with a corresponding file in a folder of the primary path to the set of actions when the file in the folder of the secondary path is older than the corresponding file in the folder of the primary path. In one example of block 510, sync tool 100 adds action 210(3) to set of actions 186.

Figure 6:
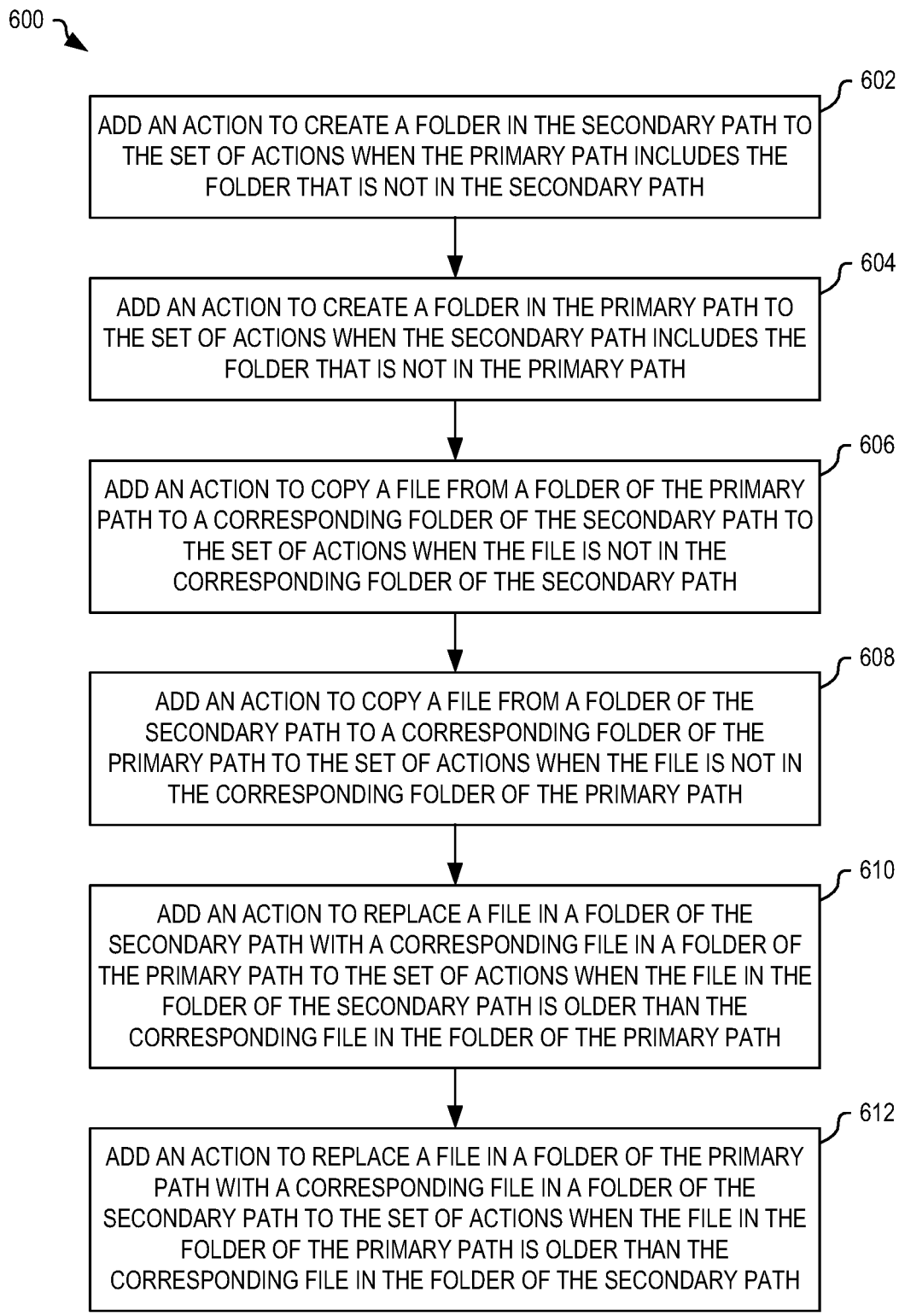
FIG. 6 is a flowchart illustrating one example method for generating a set of actions to globally synchronize the primary path and the secondary path, in embodiments.

FIG. 6 is a flowchart illustrating one example method 600 for generating a set of actions to globally synchronize primary path 180 and secondary path 182, in embodiments. Method 500 is one example of functionality of block 408 of FIG. 4 for example.

In block 602, method 600 adds an action to create a folder in the secondary path to the set of actions when the primary path includes the folder that is not in the secondary path. In one example of block 602, sync tool 100 adds an action to create folder 172 at secondary path 182 when folder 172 is not present.

In block 604, method 600 adds an action to create a folder in the primary path to the set of actions when the secondary path includes the folder that is not in the primary path. In one example of block 604, sync tool 100 adds an action to create folder 122 at primary path 182 when folder 122 is not present.

In block 606, method 600 adds an action to copy a file from a folder of the primary path to a corresponding folder of the secondary path to the set of actions when the file is not in the corresponding folder of the secondary path. In one example of block 606, sync tool 100 adds action 210(1) to set of actions 186.

In block 608, method 600 adds an action to copy a file from a folder of the secondary path to a corresponding folder of the primary path to the set of actions when the file is not in the corresponding folder of the primary path. In one example of block 608, sync tool 100 adds an action 210 to set of actions 186 to copy file 174 from folder 172 of secondary path 182 to folder 122 of primary path 180.

In block 610, method 600 adds an action to replace a file in a folder of the secondary path with a corresponding file in a folder of the primary path to the set of actions when the file in the folder of the secondary path is older than the corresponding file in the folder of the primary path. In one example of block 610, sync tool 100 adds action 210(3) to set of actions 186.

In block 612, method 600 adds an action to replace a file in a folder of the primary path with a corresponding file in a folder of the secondary path to the set of actions when the file in the folder of the primary path is older than the corresponding file in the folder of the secondary path. In one example of block 612, sync tool 100 adds an action 210 to set of actions 186 to replace file 124 of folder 122 at primary path 180 with file 124 of folder 172 at secondary path 182 when the file at folder 172 is newer than the file at folder 122.

In these examples, the user runs sync tool 100 on mobile computer 152 and selects office computer 102 is primary path 180 and mobile computer 152 is secondary path 182; however, the user could also run sync tool 100 on office computer 102, selecting office computer 102 is primary path 180 and mobile computer 152 is secondary path 182 to achieve the same folder and file synchronization. Alternatively, where folder 172 and its corresponding files are newer than files within folder 122, the user could run sync tool 100 on mobile computer 152 selecting mobile computer 152 as primary path 180 and office computer 102 as secondary path 182, or the user could run sync tool 100 on office computer 102, selecting mobile computer 152 as primary path 180 and office computer 102 as secondary path 182 to achieve the same folder and file synchronization.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A computer implemented method for secure file synchronization, comprising:
    receiving a primary path from a user;
    receiving a secondary path from the user;
    determining differences between (a) primary folders and primary files at the primary path and (b) secondary folders and secondary files at the secondary path;
    generating a set of actions that synchronize folders and files in the primary path and the secondary path based on the differences; then
    generating an interactive dialog having:
        a selectable list of the set of actions;
        a delete selected button that deletes selected ones of the actions from the selectable list; and
        a sync button;
    interacting with the user via the interactive dialog to edit the set of actions; and
    implementing each action in the edited set of actions in response to selection of the sync button by the user.

2. The method of claim 1, the interacting comprising:
    displaying the set of actions in the interactive dialog;
    interacting with the user to select one or more of the actions;
    receiving, from the dialog, a delete selected actions command in response to selection of the delete selected button; and
    deleting the one or more selected actions from the set of actions.

3. The method of claim 1, the generating the set of actions comprising:
    adding an action to create a folder in the secondary path to the set of actions when the primary path includes the folder that is not in the secondary path;
    adding an action to copy a file from a folder of the primary path to a corresponding folder of the secondary path to the set of actions when the file is not in the corresponding folder of the secondary path;
    adding an action to delete a folder from the secondary path to the set of actions when the folder is in the secondary path and not in the primary path;
    adding an action to delete a file from a folder of the secondary path to the set of actions when the file is in the folder of the secondary path and not in the corresponding folder of the primary path; and
    adding an action to replace a file in a folder of the secondary path with a corresponding file in a folder of the primary path to the set of actions when the file in the folder of the secondary path is older than the corresponding file in the folder of the primary path.

4. The method of claim 1, the generating the set of actions comprising:
    adding an action to create a folder in the secondary path to the set of actions when the primary path includes the folder that is not in the secondary path;
    adding an action to create a folder in the primary path to the set of actions when the secondary path includes the folder that is not in the primary path;
    adding an action to copy a file from a folder of the primary path to a corresponding folder of the secondary path to the set of actions when the file is not in the corresponding folder of the secondary path;
    adding an action to copy a file from a folder of the secondary path to a corresponding folder of the primary path to the set of actions when the file is not in the corresponding folder of the primary path;
    adding an action to replace a file in a folder of the secondary path with a corresponding file in a folder of the primary path to the set of actions when the file in the folder of the secondary path is older than the corresponding file in the folder of the primary path; and
    adding an action to replace a file in a folder of the primary path with a corresponding file in a folder of the secondary path to the set of actions when the file in the folder of the primary path is older than the corresponding file in the folder of the secondary path.

5. The method of claim 1, the determining differences comprising determining differences recursively to include files in sub-folders of the primary path and files in sub-folders of the secondary path.

6. The method of claim 1, the implementing comprising interpreting each of the actions remaining in the edited set of actions and performing the action on one or both of the primary path and the secondary path.

7. The method of claim 1, wherein the action is one of: create a folder in the secondary path, copy a file from a folder of the primary path to a corresponding folder of the secondary path, delete a folder from the secondary path, delete a file from a folder of the secondary path, replace a file in a folder of the secondary path with a corresponding file in a folder of the primary path create a folder in the secondary path, create a folder in the primary path, copy a file from a folder of the primary path to a corresponding folder of the secondary path, copy a file from a folder of the secondary path to a corresponding folder of the primary path, replace a file in a folder of the secondary path with a corresponding file in a folder of the primary path, and replace a file in a folder of the primary path with a corresponding file in a folder of the secondary path.

* * * * *